Patented Aug. 30, 1949

2,480,819

UNITED STATES PATENT OFFICE 2,480,819

4,5-DIHYDRO-2-IMIDAZOLETHIONES

Ferdinand B. Zienty, St. Louis, Mo., assignor to Monsanto Chemical Company, St. Louis, Mo., a corporation of Delaware No Drawing. Application June 11, 1945, Serial No. 598,924

13 Claims. (Cl. 260—309.6)

This invention relates to 4,5-dihydro-2-imidazolethiones and particularly to a novel process of preparing them.

I have found that 4,5-dihydro-2-imidazolethiones can be prepared by heating the N-monoformyl derivative of an ethylene-diamine with sulfur at temperatures within the range of 115–250° C., or even higher, and recovering the product from the reaction mixture, for example by solvent extraction of the reaction mixture and subsequent separation of the product from the solvent. I have found that this method gives good yields and good quality of product.

N-monoformyl derivatives of N,N'-di-substituted ethylene-diamines of the type: N,N'-dialkyl, N,N'-diaryl, N,N'-diaralkyl and N,N'-dicycloalkyl, may be prepared for use in the process of the present invention by the method described in my co-pending application Ser. No. 598,923 filed June 11, 1945, now U. S. Patent 2,453,057, in which a mixture of formic acid and the N,N'-di-substituted ethylenediamine derivative are heated at a temperature at which substantially one molecule of water is split off from the reactants and in the presence of the water of dehydration. N-monoformyl derivatives of other types of ethylenediamine compounds, such as ethylenediamine and numerous others may be prepared by heating an alkyl formate, such as ethyl formate with the ethylenediamine and subsequently distilling off the desired N-monoformyl derivative. Any other desired methods may be employed for the preparation of the N-monoformyl ethylenediamine derivative used as the starting material in the process of the present invention.

The process of the present invention is applicable for the preparation of a wide range of 4,5-dihydro-2-imidazolethiones, employing as a starting material an N-monoformyl derivative of an ethylenediamine, ranging from ethylenediamine to N,N'-di-substituted ethylenediamines and ethylenediamines having substituents on the carbon atoms of the ethylene residue, in which instance the substituents may or may not contain reaction radicals such as hydroxyl, carboxyl, amino or aldehyde radicals as desired. Illustrative of the compounds which may be prepared by the process of the present invention are the following:

4,5-dihydro-2-imidazolethione.
1,3-diethyl-4,5-dihydro-2-imidazolethione
1,3-dipropyl-4,5-dihydro-2-imidazolethione
1,3-dibutyl-4,5-dihydro-2-imidazolethione
1,3-diethylhexyl-4,5-dihydro-2-imidazolethione
1,3-dioctyl-4,5-dihydro-2-imidazolethione
1,3-didodecyl-4,5-dihydro-2-imidazolethione
1,3-dicyclopropyl-4,5-dihydro-2-imidazolethione
1,3-dicyclohexyl-4,5-dihydro-2-imidazolethione
1,3-diphenyl-4,5-dihydro-2-imidazolethione
1,3-dibenzyl-4,5-dihydro-2-imidazolethione
4-dodecyl-4,5-dihydro-2-imidazolethione
1,3 - dibutyl - 4 - methyl - 5 - heptyl - 4,5 - dihydro-2-imidazolethione
1,3-dicyclohexyl-4-tridecyl-4,5-dihydro-2-imidazolethione
1,3 - dibutyl - 4,5 - dipropyl - 4,5 - dihydro - 2 - imidazolethione
1,3 - di(2' - phenoxyethyl)4,5 - dihydro - 2 - imidazolethione Numerous other 4,5-dihydro-2-imidazolethiones may be prepared by the process of the present invention. Some of the 4,5-dihydro-2-imidazolethiones are crystalline solids, for example, 1,3-dicyclohexyl-4,5-dihydro-2-imidazolethione and are useful as decorative agents in plastic compositions. Moreover, I have found that 1,3-dialkyl-4,5-dihydro-2-imidazolethiones having alkyl radicals containing from 3 to 18 carbon atoms possess very outstanding properties as toxicants for mites such as red spider. For example, 1,3-dibutyl-4,5-dihydro-2-imidazolethione is highly toxic to red spider even at low concentrations of the toxicant. These alkyl-substituted compounds are also toxic to carpet beetles and prevent their feeding even at low concentrations of the toxicant. Many of these alkyl-substituted compounds are effective as components of household fly sprays, yielding high grade fly sprays; they are also promising as plant and seed fungicides.

The following examples will serve to illustrate the process and products of the present invention. These examples are to be construed merely as illustrative and not as limiting the invention except as described in the appended following claims:

Example I

A mixture of 20 g. (0.1 mole) of N-formyl-N,N'-dibutyl ethylenediamine and 4.0 g. of sulfur was stirred and heated at 135–140° C. until the evolution of water ceased. The reaction time was about two hours. The addition of more sulfur followed by heating did not cause the evolution of any additional water. The cooled mixture was treated with 50 cc. of methanol and the unreacted sulfur was filtered off and washed with methanol. On distillation of the combined filtrates a fraction boiling at 183–185° C./8 mm. and consisting of 1,3-dibutyl-4,5-dihydro-2-imidazolethione was obtained. Yellow liquid, weight 17.3 g. (80.8% yield). $n_D$=1.5200 at 25° C.

*Example II*

A mixture of 25.2 g. (0.1 mole) of N-formyl-N,N'-dicyclohexyl ethylenediamine and 4.0 g. (0.125 mole) of powdered sulfur was stirred and heated at 130° C., and the temperature was raised slowly to 150° C. At the end of 10 minutes the evolution of gas had ceased and the dark brown mixture was cooled to about 50° C. and treated with 100 cc. of methanol. The mixture was then cooled with stirring to 5° C. and crystals which formed were filtered off, washed with methanol and dried. Yield, 12 g. (45%) of 1,3-dicyclohexyl-4,5-dihydro-2-imidazolethione. The product was recrystallized from a 1:3 mixture of benzene and methanol using decolorizing charcoal. Colorless shiny plates M. P. 225–226° C. (Corr).

*Example III*

N-formyl-N,N'-dipropyl ethylenediamine was mixed with powdered sulfur in the ratio of 0.1 mole of the former to 0.125 mole of the latter. The mixture was stirred and heated at 130° C. The temperature was slowly raised to 150° C. The product, 1,3-dipropyl-4,5-dihydro-2-imidazolethione, was recovered from the reaction mixture by the procedure employed in Example I.

*Example IV*

A 0.1 mole portion of N-formyl-N,N'-didodecyl-ethylenediamine was mixed with a 0.125 mole portion of powdered sulfur and the mixture was heated at 130° C. The temperature was raised slowly to 150° C. The reaction was cooled and the product, 1,3-didodecyl-4,5-dihydro-2-imidazolethione, was recovered from the reaction mixture by the procedure employed in Example I.

*Example V*

A 0.1 mole portion of N-formyl-N,N'-dibenzyl ethylene diamine was mixed with a 0.125 mole portion of powdered sulfur and the mixture was heated at 130° C. The temperature was slowly raised to 150° C. The product, 1,3-dibenzyl-4,5-dihydro-2-imidazolethione was recovered from the reaction mixture by the procedure employed in Example II.

*Example VI*

A mixture of 2.4 g. (0.01 mole) of N-formyl-N,N'-diphenyl ethylenediamine and 0.4 g. (0.0125 mole) of sulfur was heated at 210° C. until the evolution of water from the reaction mixture had ceased (about 10 minutes). The mixture was cooled and the solid mass was disintegrated and recrystallized from methanol, yielding yellowish crystals of 1,3-diphenyl-4,5-dihydro-2-imidazole-thione, melting point 187–188° C. (Corr).

*Example VII*

A 0.1 mole portion of N-formyl-N,N'-di(2-methoxyethyl)-ethylenediamine was mixed with a 0.125 mole portion of powdered sulfur and the mixture was heated at 130° C. The temperature was slowly raised to 150° C. The product, 1,3-di(2'-methoxyethyl)-4,5-dihydro-2-imidazolethione, was recovered from the reaction mixture by extracting with methanol.

*Example VIII*

A 0.1 mole portion of N-formyl-N,N'-diethylhexyl ethylenediamine was mixed with a 0.125 mole portion of powdered sulfur and the mixture was heated at 130° C. The temperature was slowly raised to 150° C. The product, 1,3-diethylhexyl-4,5-dihydro-2-imidazolethione, recovered from the reaction mixture by the procedure employed in Example I.

*Example IX*

A 0.1 mole portion of N-formyl-N,N'-dinaphthyl ethylenediamine was mixed with a 0.125 mole portion of powdered sulfur and the mixture was heated at 130° C. The temperature was slowly raised to 150° C. The product, 1,3-dinaphthyl-4,5-dihydro-2-imidazolethione, was recovered from the reaction mixture by the procedure employed in Example II.

*Example X*

A 0.1 mole portion of N-formyl-N,N'-dicyclopropyl ethylenediamine was mixed with a 0.125 mole portion of powdered sulfur and the mixture was heated at 130° C. The temperature was slowly raised to 150° C. The product, 1,3-dicyclopropyl-4,5-dihydro-2-imidazolethione, was recovered from the reaction mixture by the procedure employed in Example II.

*Example XI*

A 0.5 mole portion of a technical mixture of monohydric aliphatic alcohols containing from 8 to 18 carbon atoms was converted to the corresponding alkyl chlorides. Of the quantity of mixed alkyl chlorides thus obtained, a 0.1 mole portion, calculated on the basis of the average chlorine content of the mixture, was heated at approximately 120° C. with 0.1 mole of ethylenediamine. The resulting mixture of N,N'-dialkyl ethylenediamines recovered from the reaction mixture contained alkyl radicals having from 8 to 18 carbon atoms. This material was then heated under a reflux condenser with 0.4 mole of 85% formic acid at a temperature of 100–130° C. until substantially one mole of water had split off for each mole of the N,N'-dialkyl ethylenediamine mixture, calculated on the average molecular weight of the mixture. The resulting N-formyl-N,N'-dialkyl ethylenediamine mixture contained alkyl radicals having from 8 to 18 carbon atoms. The N-formyl derivatives were recovered from the reaction mixture by quenching the reaction mixture with water, filtering, alkalizing the filtrate, extracting the filtrate with benzene and recovering the mixture of N-formyl-N,N'-dialkyl ethylenediamines from the benzene extract. This mixture was then heated with 0.1 mole of sulfur at 150° C. until the evolution of water from the reaction mixture had ceased. The reaction mixture was extracted with methanol, filtered and the filtrate was distilled to remove methanol. The residue was subsequently distilled under reduced pressure to recover a mixture of 1,3-dialkyl-4,5-dihydro-2-imidazolethiones having alkyl radicals containing from 8 to 18 carbon atoms.

*Example XII*

Examples I and XI were repeated with the exception that, instead of separating the imidazolethiones from the reaction mixture, the entire reaction mixture consisting predominantly of imidazolethiones together with a portion of free sulfur, some of which had dissolved in the imidazolethiones, was tested as a miticide and also as an insecticide. It was found that the materials thus tested were comparable in activity for both purposes to the isolated imidazolethione products of Examples I and XI.

I claim:

1. A method of preparing 4,5-dihydro-2-imidazolethiones comprising heating an N-monoformyl derivative of an ethylenediamine in which the unacylated nitrogen radical has at least one acid-reactive hydrogen radical with sulfur at a temperature in the range of 115–250° C., and recovering the 4,5-dihydro-2-imidazolethione from the reaction mixture.

2. A method of preparing 1,3-dialkyl-4,5-dihydro-2-imidazolethiones comprising heating an N-monoformyl derivative of an N,N'-dialkyl ethylenediamine in which the unacylated nitrogen radical has at least one acid-reactive hydrogen radical with sulfur at a temperature in the range of 115–250° C., and recovering the 1,3-dialkyl-4,5-dihydro-2-imidazolethione from the reaction mixture.

3. A method of preparing 1,3-dibutyl-4,5-dihydro-2-imidazolethiones comprising heating N-formyl-N,N'-dibutyl ethylenediamine with sulfur at a temperature in the range of 115–250° C., and recovering 1,3-dibutyl-4,5-dihydro-2-imidazolethione from the reaction mixture.

4. A method of preparing 1,3-diaralkyl-4,5-dihydro-2-imidazolethiones comprising heating an N-monoformyl derivative of an N,N'-diaralkyl ethylenediamine, in which the unacylated nitrogen radical has at least one acid-reactive hydrogen radical, with sulfur at a temperature in the range of 115–250° C., and recovering the 1,3-diaralkyl-4,5-dihydro-2-imidazolethione from the reaction mixture.

5. A method of preparing 1,3-dibenzyl-4,5-dihydro-2-imidazolethione comprising heating N-formyl-N,N'-dibenzyl ethylenediamine with sulfur at a temperature in the range of 115–250° C., and recovering the 1,3-dibenzyl-4,5-dihydro-2-imidazolethione from the reaction mixture.

6. A method of preparing 1,3-dicycloalkyl-4,5-dihydro-2-imidazolethiones comprising heating an N-monoformyl derivative of an N,N'-dicycloalkyl ethylenediamine in which the unacylated nitrogen radical has at least one acid reactive hydrogen radical with sulfur at a temperature in the range of 115–250° C., and recovering the 1,3-dicycloalkyl-4,5-dihydro-2-imidazolethione from the reaction mixture.

7. A method of preparing 1,3-dicyclohexyl-4,5-dihydro-2-imidazolethione comprising heating N-formyl-N,N'-dicyclohexyl ethylenediamine with sulfur at a temperature in the range of 115–250° C., and recovering the 1,3-dicyclohexyl-4,5-dihydro-2-imidazolethione from the reaction mixture.

8. In a method of preparing a 4,5-dihydro-2-imidazolethione, the step which comprises heating a monoformyl derivative of an ethylene diamine in which the unacylated nitrogen radical has at least one acid-reactive hydrogen radical, with sulfur at a temperature in the range 115–250° C.

9. In a method of preparing a 1,3-dibutyl-4,5-dihydro-2-imidazolethione, the step which comprises heating an N-formyl-N,N'-dibutyl ethylene diamine with sulfur at a temperature in the range 115–250° C.

10. In a method of preparing a 1,3-dibenzyl-4,5-dihydro-2-imidazolethione, the step which comprises heating N-formyl-N,N'-dibenzyl ethylene diamine with sulfur at a temperature in the range 115–250° C.

11. In a method of preparing 1,3-dicyclohexyl-4,5-dihydro-2-imidazolethione, the step which comprises heating N-formyl-N,N'-dicyclohexyl ethylene diamine with sulfur at a temperature in the range 115–250° C.

12. As a new composition of matter, 1,3-dialkyl-4,5-dihydro-imidazolethiones having alkyl radicals containing from 3 to 18 carbon atoms.

13. As a new composition of matter, 1,3-dibutyl-4,5-dihydro-2-imidazolethione.

FERDINAND B. ZIENTY.

REFERENCES CITED

The following references are of record in the file of this patent:

UNITED STATES PATENTS

| Number | Name | Date |
|--------|------|------|
| 1,929,560 | Morton | Oct. 10, 1933 |